United States Patent
Guo et al.

(10) Patent No.: US 7,971,240 B2
(45) Date of Patent: Jun. 28, 2011

(54) SESSION KEY SECURITY PROTOCOL

(75) Inventors: Wei-Quiang Michael Guo, Bellevue, WA (US); John Hal Howard, Sammamish, WA (US); Kok Wai Chan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 2 days.

(21) Appl. No.: 12/426,726

(22) Filed: Apr. 20, 2009

(65) Prior Publication Data

US 2009/0204808 A1    Aug. 13, 2009

Related U.S. Application Data

(63) Continuation of application No. 10/146,686, filed on May 15, 2002, now Pat. No. 7,523,490.

(51) Int. Cl.
*H04L 9/32* (2006.01)

(52) U.S. Cl. .......... 726/10; 713/168; 713/170; 713/176; 713/181; 380/277; 380/278

(58) Field of Classification Search .................. 713/168, 713/170, 176, 181; 380/277–278; 726/10
See application file for complete search history.

(56) References Cited

U.S. PATENT DOCUMENTS

| | | |
|---|---|---|
| 5,491,749 A | 2/1996 | Rogaway |
| 5,491,750 A | 2/1996 | Bellare |
| 5,535,279 A | 7/1996 | Seestrom |
| 5,673,316 A | 9/1997 | Auerbach et al. |
| 5,682,478 A | 10/1997 | Watson |
| 5,708,709 A | 1/1998 | Rose |
| 5,729,608 A | 3/1998 | Janson |
| 5,778,065 A | 7/1998 | Hauser et al. |
| 5,812,776 A | 9/1998 | Gifford |
| 5,812,784 A | 9/1998 | Watson |
| 5,864,843 A * | 1/1999 | Carino et al. .................... 1/1 |
| 5,875,296 A | 2/1999 | Shi et al. |

(Continued)

FOREIGN PATENT DOCUMENTS

EP    0969366 A1    1/2000

(Continued)

OTHER PUBLICATIONS

Hughes, Larry J., Jr., "Internet Exiting Technologies Internet Security", Feb. 22, 1997, Risk Management for System Managers, 11 pages.

(Continued)

*Primary Examiner* — Michael J Simitoski
*Assistant Examiner* — Yin-Chen Shaw
(74) *Attorney, Agent, or Firm* — Senniger Powers LLP

(57) ABSTRACT

Exchanging information in a multi-site authentication system. A network server receives, from an authentication server, a request by a client computing device for a service provided by the network server along with an authentication ticket. The authentication ticket includes: a session key encrypted by a public key associated with the network server, message content encrypted by the session key, and a signature for the encrypted session key and the encrypted message content. The signature includes address information of the network server. The network server identifies its own address information in the signature to validate the signature included in the authentication ticket and verifies the authentication ticket content based on the signature included in the authentication ticket. The network server decrypts the encrypted session key via a private key associated with the second network server and decrypts the encrypted message content via the decrypted session key.

19 Claims, 4 Drawing Sheets

U.S. PATENT DOCUMENTS

| | | | |
|---|---|---|---|
| 5,898,780 A | 4/1999 | Liu et al. | |
| 5,903,721 A | 5/1999 | Sixtus | |
| 5,918,228 A | 6/1999 | Rich et al. | |
| 5,944,824 A | 8/1999 | He et al. | |
| 5,948,064 A | 9/1999 | Bertram et al. | |
| 5,959,985 A | 9/1999 | Freen | |
| 5,987,232 A * | 11/1999 | Tabuki | 726/5 |
| 6,006,332 A | 12/1999 | Rabne et al. | |
| 6,055,236 A | 4/2000 | Nessett et al. | |
| 6,058,188 A | 5/2000 | Chandersekaran et al. | |
| 6,088,451 A | 7/2000 | He et al. | |
| 6,092,196 A | 7/2000 | Reiche | |
| 6,092,199 A | 7/2000 | Dutcher et al. | |
| 6,098,056 A | 8/2000 | Rusnak et al. | |
| 6,134,592 A | 10/2000 | Montulli | |
| 6,138,159 A | 10/2000 | Phaal | |
| 6,148,404 A | 11/2000 | Yatsukawa | |
| 6,160,891 A | 12/2000 | Al-Salqan | |
| 6,226,618 B1 | 5/2001 | Downs et al. | |
| 6,226,752 B1 | 5/2001 | Gupta et al. | |
| 6,246,771 B1 * | 6/2001 | Stanton et al. | 380/286 |
| 6,263,432 B1 * | 7/2001 | Sasmazel et al. | 713/100 |
| 6,292,896 B1 | 9/2001 | Guski et al. | |
| 6,311,275 B1 | 10/2001 | Jin et al. | |
| 6,314,425 B1 | 11/2001 | Serbinis | |
| 6,321,262 B1 | 11/2001 | Springer | |
| 6,363,365 B1 | 3/2002 | Kou | |
| 6,374,402 B1 | 4/2002 | Schmeidler et al. | |
| 6,487,584 B1 | 11/2002 | Bunney | |
| 6,578,199 B1 | 6/2003 | Tsou et al. | |
| 6,640,239 B1 | 10/2003 | Gidwani | |
| 6,687,743 B1 | 2/2004 | Innes | |
| 6,725,376 B1 | 4/2004 | Sasmazel | |
| 6,760,752 B1 | 7/2004 | Liu et al. | |
| 6,763,468 B2 | 7/2004 | Gupta et al. | |
| 6,782,478 B1 | 8/2004 | Probert | |
| 6,823,454 B1 | 11/2004 | Hind | |
| 6,912,582 B2 | 6/2005 | Guo et al. | |
| 6,934,393 B2 | 8/2005 | Aull | |
| 6,981,156 B1 | 12/2005 | Stern et al. | |
| 7,017,188 B1 | 3/2006 | Schmeidler et al. | |
| 7,036,142 B1 | 4/2006 | Zhang et al. | |
| 7,073,195 B2 | 7/2006 | Brickell et al. | |
| 7,100,049 B2 | 8/2006 | Gasparini et al. | |
| 7,228,419 B2 | 6/2007 | Iino | |
| 7,401,235 B2 | 7/2008 | Mowers et al. | |
| 7,451,312 B2 * | 11/2008 | Medvinsky et al. | 713/168 |
| 7,636,941 B2 | 12/2009 | Blinn et al. | |
| 7,639,672 B2 | 12/2009 | Foote | |
| 2001/0014158 A1 | 8/2001 | Baltzley | |
| 2001/0020228 A1 | 9/2001 | Cantu et al. | |
| 2001/0025256 A1 | 9/2001 | Oliphant et al. | |
| 2001/0034841 A1 | 10/2001 | Shambroom | |
| 2001/0037462 A1 | 11/2001 | Bengston | |
| 2001/0045451 A1 | 11/2001 | Tan et al. | |
| 2001/0054155 A1 | 12/2001 | Hagan et al. | |
| 2002/0004773 A1 | 1/2002 | Xu et al. | |
| 2002/0029350 A1 | 3/2002 | Cooper et al. | |
| 2002/0035681 A1 | 3/2002 | Maturana et al. | |
| 2002/0099809 A1 | 7/2002 | Lee | |
| 2002/0112155 A1 | 8/2002 | Martherus et al. | |
| 2002/0133723 A1 | 9/2002 | Tait | |
| 2002/0150253 A1 | 10/2002 | Brezak et al. | |
| 2002/0152393 A1 | 10/2002 | Thoma et al. | |
| 2002/0194501 A1 | 12/2002 | Wenocur et al. | |
| 2003/0084172 A1 | 5/2003 | de Jong et al. | |
| 2003/0093667 A1 * | 5/2003 | Dutta et al. | 713/161 |
| 2003/0093694 A1 | 5/2003 | Medvinsky et al. | |
| 2003/0108205 A1 | 6/2003 | Joyner et al. | |
| 2003/0149880 A1 | 8/2003 | Shamsaasef et al. | |
| 2003/0163691 A1 | 8/2003 | Johnson | |
| 2003/0163693 A1 | 8/2003 | Medvinsky | |
| 2003/0188193 A1 | 10/2003 | Venkataramappa | |
| 2003/0204579 A1 | 10/2003 | Lutz | |
| 2003/0217288 A1 | 11/2003 | Guo et al. | |
| 2004/0098616 A1 | 5/2004 | Jenner et al. | |
| 2004/0103311 A1 | 5/2004 | Barton et al. | |
| 2004/0158743 A1 | 8/2004 | Ham et al. | |
| 2004/0225878 A1 | 11/2004 | Costa-Requena et al. | |
| 2005/0005133 A1 | 1/2005 | Xia et al. | |
| 2005/0074126 A1 | 4/2005 | Stanko | |
| 2005/0097320 A1 | 5/2005 | Golan et al. | |
| 2005/0216771 A1 | 9/2005 | Malcolm | |
| 2005/0235341 A1 | 10/2005 | Stieglitz et al. | |
| 2007/0027992 A1 | 2/2007 | Judge et al. | |
| 2007/0086592 A1 | 4/2007 | Ellison et al. | |
| 2007/0130350 A1 | 6/2007 | Alperovitch et al. | |
| 2007/0162349 A1 | 7/2007 | Silver | |
| 2007/0214151 A1 | 9/2007 | Thomas et al. | |
| 2007/0250919 A1 | 10/2007 | Shull et al. | |
| 2008/0141366 A1 | 6/2008 | Cross et al. | |
| 2008/0256364 A1 | 10/2008 | Chang et al. | |
| 2009/0113209 A1 | 4/2009 | Lee et al. | |

FOREIGN PATENT DOCUMENTS

| | | |
|---|---|---|
| JP | 05-224604 | 9/1993 |
| JP | 08-171535 | 7/1996 |
| JP | 09-507729 | 8/1997 |
| JP | 10-177341 | 6/1998 |
| JP | 11-215117 | 8/1999 |
| JP | 11-239124 | 8/1999 |
| JP | 2001-177513 | 6/2001 |
| JP | 2001-202437 | 7/2001 |
| JP | 2002-032344 | 1/2002 |
| JP | 2002-132730 | 5/2002 |
| JP | 2003-198524 | 7/2003 |
| WO | 0177775 A2 | 10/2001 |
| WO | 0233884 A | 4/2002 |

OTHER PUBLICATIONS

Ichimatsu, S. "Security of Computer Network: Study on Data Protection and Encryption", Jul. 29, 1983, 9 pages.

Ganesan, "The Yaska Security System," Communications of the ACM, Mar. 1996, pp. 55-60, vol. 39, Issue 3, ACM Press, New York, USA.

Henry, "Who's Got the Key?," Proceedings of the 27th Annual ACM SI/GUCCS Conference on Mile High Expectations, 1999, pp. 106-110, ACM Press, New York, USA.

Steiner et al., "Kerberos: An Authentication Service for Open Network Systems," USENIX Winter Conference, 1988, pp. 191-202.

Bruce, "Our WebWasher Workshop," downloaded by the Examiner on Sep. 9, 2006, from wbe.archive.org, with pages dating prior to Nov. 19, 2002, downloaded pp. 1-95.

Unknown, "Removing Adverts from Web Pages," Flourish.org, published on the Web as of Oct. 3, 2002, downloaded by the Examiner on Sep. 4, 2006, from http://web.archive.org/web/20021003023544/http://www.flourish.org/adremove, pp. 1-6.

Harbitter et al., "The Performance of Public Key-Enabled Kerberos Authentication in Mobile Computing Applications," Proceedings of the 8th Annual ACM Conference on Computer and Communications Security, 2001, pp. 78-85, ACM Press, New York, USA.

Bird et al, "The KryptoKnight Family of Light-Weight Protocols for Authentication and Key Distribution," IEEE/ACM Transactions on Networking (TON), Feb. 1995, pp. 31-41, vol. 3, Issue 1, ACM Press, New York, USA.

Park, "Security Protocol for IEEE 802.11 Wireless Local Area Network," Mobile Networks and Applications, Sep. 1998, pp. 237-246, vol. 3, Issue 3, ACM Press, New York, USA.

* cited by examiner

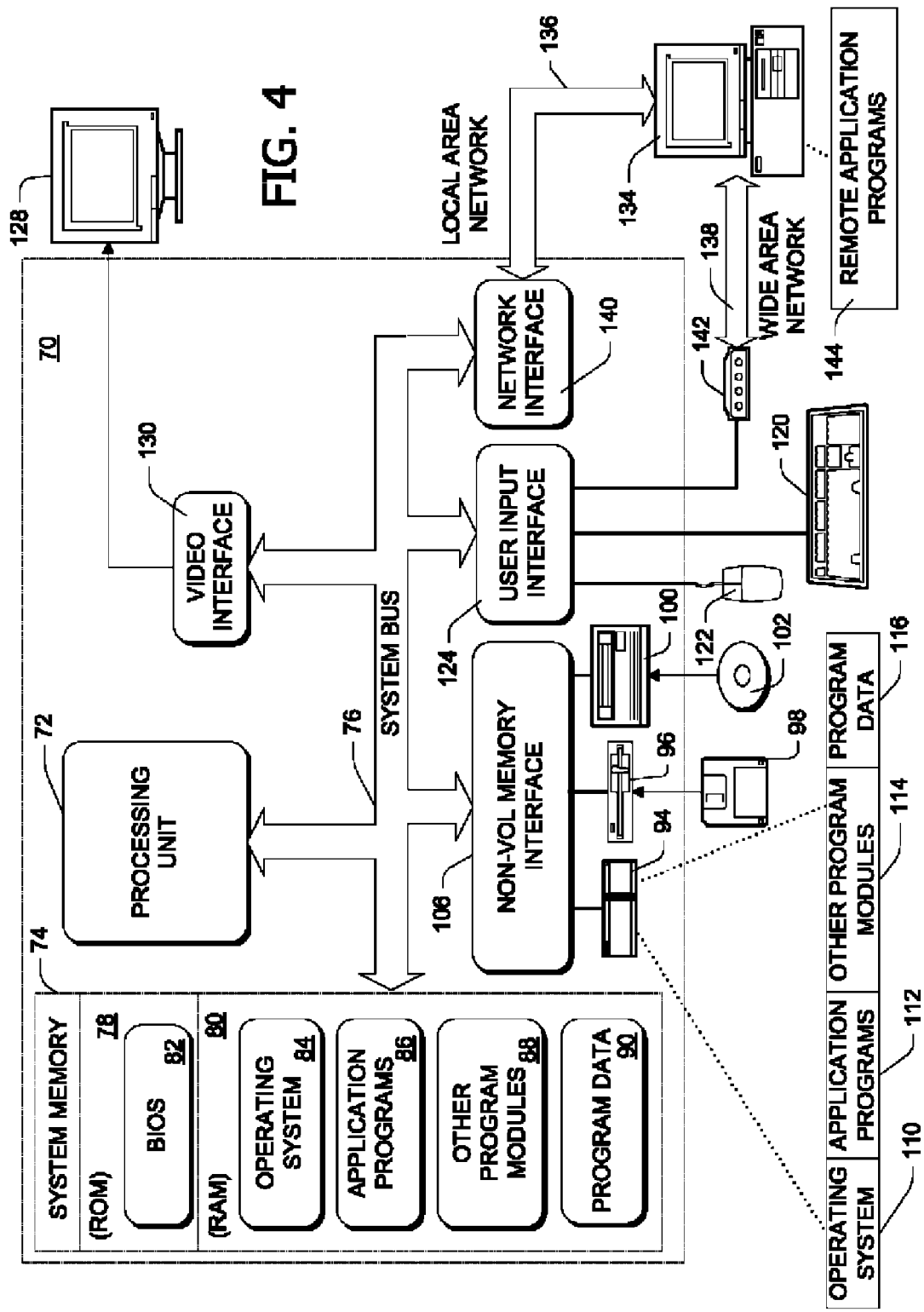

SESSION KEY SECURITY PROTOCOL

BACKGROUND

Aspects of the present invention relate to the field of computer network environments. In particular, these aspects relate to improved security in a multi-site user authentication system by using a session key security protocol.

Web sites, or Internet sites, very often provide information, products, services, or the like to their users. Many web sites require users to "register" before their web servers will grant access to the users. During registration, a user typically supplies personal information such as username, account number, address, telephone number, e-mail address, computer platform, age, gender, and/or hobbies to the registering web site. The registration information may be necessary to complete transactions (e.g., commercial or financial transactions). Typically, the information also permits the web site to contact the user directly (e.g., via e-mail) to announce, for example, special promotions, new products, or new web site features. Additionally, web sites often collect user information so web site operators can better target future marketing activities or adjust the content provided by the sites.

When registering a user for the first time, a web site typically requests that the user select a login ID and an associated password. The login ID allows the web site to identify the user and retrieve the user's information during subsequent user visits to the web site. Generally, the login ID must be unique to the web site such that no two users have the same login ID. The password associated with the login ID allows the web site to authenticate the user during subsequent visits to the web site. The password also prevents others (who do not know the password) from accessing the web site using the user's login ID. This password protection is particularly important if the web site stores private or confidential information about the user, such as financial information or medical records.

If the user visits several different web sites, each web site may require entry of similar registration information about the user, such as the user's name, mailing address, and e-mail address. This repeated entry of identical data is tedious when visiting multiple web sites in a short period of time. Many web sites require the user to register before accessing any information provided on the site. Thus, the user must first enter the requested registration information before he or she can determine whether the site contains any information of interest.

After registering with multiple web sites, the user must remember the specific login ID and password used with each web site or other Internet service. Without the correct login ID and password, the user must re-enter the registration information. A particular user is likely to have different login IDs and associated passwords on different web sites. For example, a user named Bob Smith may select "smith" as his login ID for a particular site. If the site already has a user with a login ID of "smith" or requires a login ID of at least six characters, then the user must select a different login ID. After registering at numerous web sites, Bob Smith may have a collection of different login IDs, such as: smith, smith1, bsmith, smithb, bobsmith, bob_smith, and smithbob. Further, different passwords may be associated with different login IDs due to differing password requirements of the different web sites (e.g., password length requirements or a requirement that each password include at least one numeric character and/or at least one uppercase character). Thus, Bob Smith must maintain a list of web sites, login IDs, and associated passwords for all sites that he visits regularly.

Although presently available multi-site user authentication systems permit a web user to maintain a single login ID (and associated password) for accessing multiple, affiliated web servers or services, further improvements are desired. For example, authentication data is typically sensitive in nature and should be protected. Thus, maintaining security between numerous affiliate web servers and the authentication server performing the authentication function is important.

Presently available network authentication protocols, such as Kerberos authentication, employ a shared or single key for authenticating the identity of users attempting to log on to a network and for encrypting their communications. The use of a shared key, sometimes referred to as symmetric key encryption, requires a key provisioning process for a new web service to utilize authentication services. In a Kerberos system, the authentication server (i.e., the Kerberos server, or key distribution center (KDC)) must distribute the shared key to every affiliate server using its authentication services and must refresh the key regularly. The KDC often issues the key by postal mail. Unfortunately, the need to provide the shared key introduces significant complexity in signing up new web services and conducting ongoing maintenance (e.g., periodical key revisions). Moreover, in a federated environment involving multiple authentication service providers, key distribution becomes even more complicated.

Key distribution is further complicated when an affiliate site decides to accept a "kerb" ticket from two or more independent KDCs. Also, the key for the affiliate must be configured in both KDCs. In other words, the more KDCs that an affiliate site supports, the more complex the key distribution process. In addition, if KDCs federate with each other, they must all share keys, again adding key distribution complexity.

Keys are also at risk of being stolen at either the KDC or at one of the affiliate sites, which presents a danger of key compromise at either end of the security protocol. For instance, a human break-in at the authentication service can potentially steal all of the keys for every affiliate server. This would essentially shut down the authentication service because of the time needed to revise all of the keys across the entire network of affiliated servers.

A public key infrastructure (PKI) may also be used to support encryption as well as digital signatures. Public key encryption employs dual keys, i.e., one public key and one private key. Data encrypted by the public key can only be decrypted by the private key, and vice versa. Although PKI provides a useful protocol for authenticating and digitally signing documents, it does not perform well in a scalable/cross-platform authentication system. For example, a PKI system operates too slowly when handling large amounts of data because it generally requires much longer keys (typically, 512 bits and above, whereas a shared key uses less than 200 bits). The longer the key, the more computation power is required to encrypt and decrypt.

Moreover, PKI requires that keys be synchronized. PKI has two keys (public key and private key) and these two keys must stay in sync. There are well-established protocol/processes to revoke such a pair and generating a new pair.

For these reasons, an improved security protocol is desired to minimize the problems in a shared symmetric key protocol particularly for use in a scalable/cross-platform authentication system.

SUMMARY

Aspects of the invention meet the above needs and overcome one or more deficiencies in conventional computer systems by providing improved security for a multi-site user authentication system. Advantageously, an aspect of the invention reduces the complexity of building a scalable/cross-platform authentication system by adapting the security with features of a public key infrastructure (PKI). This minimizes the problems inherent in a shared symmetric key protocol and permits the use of legacy system/software already in place, which provides significant cost savings and promotes widespread adoption by the industry.

Even if someone steals the authentication service's private key, an improved security protocol according to an aspect of the invention permits the authentication service to quickly update its private key without disrupting the remaining trusted affiliates. Likewise, if the private key at a destination service (i.e., an affiliate web server) is stolen, the destination service can independently initiate the process of revising its own private key and public key, rather than waiting for the authentication service to issue a new key.

Aspects of the present invention also permit a destination service to have multiple private/public key pairs (e.g., one per authentication service that it trusts) to isolate security risks. At least because the security risk associated with key compromises at the authentication service is eliminated, applying PKI concepts into a shared key authentication protocol strengthens the protocol. Moreover, the features of the present invention described herein are less laborious and easier to implement than currently available techniques as well as being economically feasible and commercially practical.

Briefly described, a method embodying aspects of the invention provides information security in a multi-site authentication system that includes first and second network servers coupled to a data communication network. The method includes generating an authentication ticket from the first network server and encrypting content of the ticket. The ticket includes information associated with a user of a client computer that is also coupled to a data communication network. The first network server encrypts the ticket content using a symmetric key shared by the first and second network servers. The method further includes encrypting the shared key using a public key associated with the second network server and directing the client computer along with the ticket from the first network server to the second network server.

Another aspect of the invention is embodied by a system including an authentication server associated with a multi-site user authentication system. The authentication server retrieves login information from a user of a client computer for authenticating the user. The authentication server further generates an authentication ticket after authenticating the user. The ticket includes information associated with the user of the client computer. The authentication server uses a symmetric key shared with an affiliate server for encrypting content of the ticket. The affiliate server has a public key that the authentication server uses to encrypt the shared key.

Yet another aspect is directed to a method including generating an authentication ticket from a first network server and generating a signature for the ticket using a private key associated with the first network server. The ticket has information associated with a user of a client computer and the signature has address information for a second network server. The method further includes directing the client computer along with the ticket from the first network server to the second network server over a privacy-enhanced protocol and identifying, by the second network server, its own address information in the signature to validate the signature.

A security protocol embodying aspects of the invention includes a shared symmetric key, a public key, and a private key. A first network server and a second network server share the shared key. Using the shared key, the first network server encrypts content of an authentication ticket. The first network server also encrypts the shared key using the public key, which is associated with the second network server. Using its private key, the second network server decrypts the encrypted shared key then decrypts the content of the ticket using the decrypted shared key.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 4 is a block diagram illustrating components of a computer for use in the system of FIG. 1.

Corresponding reference characters indicate corresponding parts throughout the drawings.

DETAILED DESCRIPTION

Figure 1:
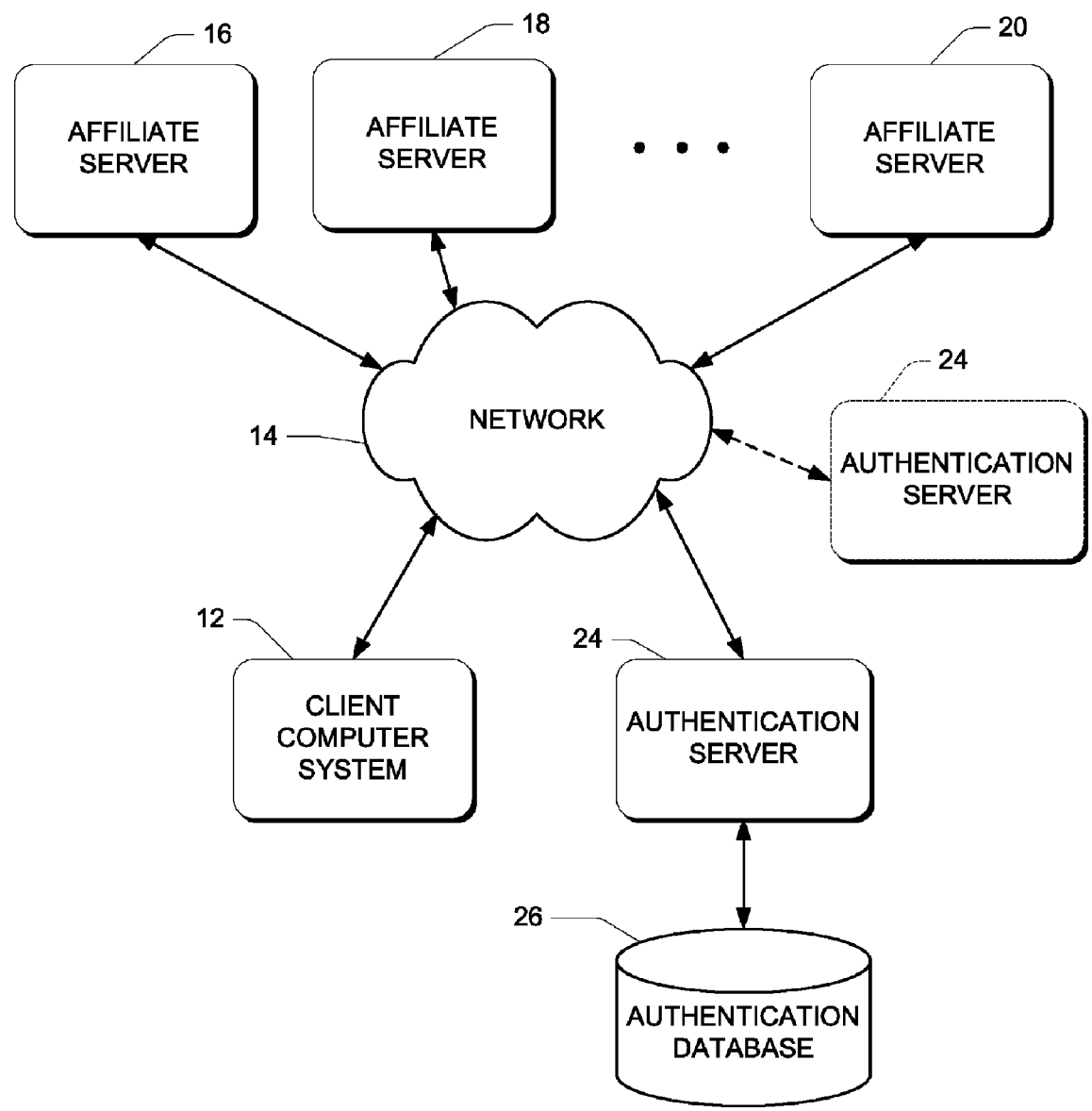
FIG. 1 is a block diagram illustrating an exemplary network environment in which an embodiment of the present invention is utilized.

Referring now to the drawings, FIG. 1 illustrates an exemplary network environment in which an embodiment of the present invention is utilized. A client computer system, or computing device, 12 is coupled to a data communication network 14. In this example, the network 14 is the Internet (or the World Wide Web). However, the teachings herein can be applied to any data communication network. Multiple affiliate servers 16, 18, and 20 are also coupled to network 14. In turn, the client computer system 12 can access the affiliate servers 16, 18, and 20 via network 14. Affiliate servers 16, 18, and 20 are also referred to as "web servers" and "network servers." An authentication server 24 coupled to network 14 allows communication between itself and client computer system 12 and web servers 16, 18, and 20. Although referred to as an "authentication server," authentication server 24 in the illustrated embodiment is also a web server capable of interacting with web browsers and other web servers. In this example, data is communicated between authentication server 24, client computer system 12, and web servers 16, 18, 20 using the hypertext transfer protocol (HTTP), a protocol commonly used on the Internet to exchange information.

An authentication database 26 is coupled to authentication server 24. The authentication database 26 contains information necessary to authenticate a user of client computer system 12 (as well as other users on the network) and also identifies which elements of the user profile information should be provided to a particular affiliate server when the user accesses the affiliate server. Although authentication database 26 is shown separately from authentication server 24, it is to be understood that in other embodiments of the invention, authentication database 26 may be contained within authentication server 24. In a federated environment, for example, a plurality of authentication servers 24 may be used to provide authentication services (see authentication server 24 shown in phantom).

The authentication server 24, as described below, authenticates a user of client computer 12 seeking access to a particular one of the affiliate servers 16, 18, 20. Authentication server 24 first requests authenticating information from the user, such as the user's login ID and password. If the user is successfully authenticated, authentication server 24 routes client computer 12 to the appropriate affiliate server for performing a desired service for the user.

As part of the user authentication process, authentication server 24 may provide certain user profile information to the affiliate server, such as the user's e-mail address, user preferences, and the type of Internet browser installed on client computer 12. This user profile information is associated with the user's login ID so that each time the user logs into a particular affiliate server, the associated user profile information is available to the affiliate server. This user profile allows the user to enter the information once and use that information during subsequent logins to new affiliate servers.

In one embodiment, an "affiliate server" is a web server that has "registered" or otherwise established a relationship or affiliation with authentication server 24. Each affiliate server 16, 18, and 20 includes a code sequence (not shown) that allows the affiliate server to communicate with authentication server 24 when a user (who is also registered with the authentication server) requests access to the affiliate server. Additional details regarding the authentication process and the interaction between client computer 12, affiliate servers 16, 18, 20, and authentication server 24 are provided below.

An aspect of the present invention provides improved security for the multi-site user authentication system shown in FIG. 1. Advantageously, the complexity of building a scalable/cross-platform authentication system is reduced by adapting the security protocol with features of a dual key encryption system. This minimizes the problems inherent in a shared symmetric key protocol and permits the use of legacy system/software already in place, which provides significant cost savings and promotes widespread adoption by the industry.

Prior to executing the authentication process described below, both the user of client computer system 12 and the operator(s) of affiliate servers 16, 18, 20 "register" with authentication server 24. This registration is a one-time process that provides necessary information to the authentication server. The user of client computer system 12 registers with authentication server 24 by providing, for example, the user's name, mailing address, and e-mail address, and/or other information about the user or client computer system 12. As part of the user registration process, the user is assigned (or selects) a login ID, which is a common login ID, used to access any affiliate server (e.g., server 16, 18, 20). The login ID may also be referred to herein as a "username" or "login name". Additionally, the user selects a password associated with the login ID that is used for authentication purposes. After registering and logging into the authentication server, the user can visit any affiliate server (i.e., affiliate servers that are also registered with the same authentication server) without requiring any additional authentication and without re-entering user information that is already contained in the associated user profile.

The operator(s) of affiliate servers 16, 18, 20 register with authentication server 24 by providing information about the affiliate server (e.g., server name and Internet address). Additionally, each affiliate server 16, 18, 20 provides information regarding its authentication requirements. The requirements for authentication may be specified in terms of a maximum time allowed since the last login and entry of authentication information by the user. These requirements may also be specified by the maximum time allowed since the last "refresh" of the authentication information by the user.

Refreshing the authentication information refers to the process of having the user re-enter the password to be certain that the appropriate user is still operating client computer system 12. This periodic refreshing of authentication information is useful if the user leaves his or her computer system without logging out of authentication server 24, thereby allowing another individual to access affiliate servers 16, 18, and 20 using the login ID of the previous user. If a user requests access to one of the affiliate servers 16, 18, and 20 after the maximum allowed time has lapsed, then authentication server 24 re-authenticates (i.e., refreshes) the user. Thus, although there is a central authentication server 24, affiliate servers 16, 18, 20 can establish their own authentication requirements to be enforced by the authentication server. After registering with authentication server 24, affiliate servers 16, 18, 20 can use the authentication server to authenticate any user that has also registered with the authentication server.

As described above, a shared symmetric key security protocol (e.g., Kerberos protocol) may be used for performing authentication between an authentication service and a destination service. In this instance, the authentication service typically accepts a username/password (or password equivalent). Upon validation of the username/password, the authentication service issues a ticket to the destination service. The ticket alone assures the destination service of the user's identity because a shared symmetric key, which is known only to the authentication service and the destination service, encrypted the ticket. This protocol also provides assurance to the authentication service that the ticket is only usable by the trusted destination service and to the destination service that the ticket came from a trusted source (i.e., the authentication service). Further, the protocol assures both the authentication service and the destination service that the content is not visible to anyone else. All of these assurances are built upon the fact that the only way to encrypt or decrypt the same content is by knowledge of the shared symmetric secret key. Typically, every destination service has its own key, so the authentication service knows all of the keys but each destination service knows only its own key.

Those skilled in the art understand that a public key infrastructure (PKI) requires that keys be synchronized. PKI has two keys (public key and private key) and these two keys must stay in sync. There are well-established protocol/processes to revoke such a pair and generating a new pair. Delegating this problem to the key pair authority and the owners of the key thus eliminates key distribution from a shared key authentication system. This aspect of the invention is described in greater detail below.

A number of encryption algorithms (e.g., 3DES and HMAC-RC4) are well accepted in the industry as being nearly impossible to decrypt the content of an encrypted blob without knowledge of the key. Therefore, safeguarding the key becomes an extremely important aspect of the security protocol. As described above, in conventional shared key system, the authentication service must securely transport the key to the destination service. The protocol should also take measures to regularly revise the key so that even if the key is stolen, the harm will be minimized. Unfortunately, this unduly complicates security in a multi-site user authentication system. Moreover, if a destination service chooses to trust more than one authentication service through the same protocol, the shared symmetric key must then also be shared among all authentication services. This adds further complexity to the distribution and updating of the shared symmetric key.

In one embodiment of the invention, a randomly generated, single-use session key replaces the shared key. Authentication server 24 encrypts the session key with a public key of the destination service (i.e., one of the affiliate server 16, 18, 20). Authentication server 24 also uses a private key to sign the content. In this manner, aspects of the invention retain the security properties of a shared symmetric key but not its shortcomings. The session key security protocol in this embodiment ensures that: (a) the authentication ticket can only be used at the particular affiliate server 16, 18, or 20; (b) the content came from the correct source (i.e., authentication server 24); (c) the content of the ticket is only known by the source and destination (i.e., the authentication server and the affiliate server, respectively); and (d) the affiliate server cannot repudiate its signature. Knowledge of the ticket's content need not be limited to the source and the destination if the ticket only contains authentication information and not private user data. In this instance, the content cannot be used at any other location and, thus, does not need to be protected. Those skilled in the art are familiar with the practice of including the signature algorithm, which is a well known, pre-defined identifier, among the data that is signed. In one embodiment of the present invention, this may be implied, or a common algorithm is assumed by both authentication server 24 and site 16.

It is to be understood that transporting the authentication ticket over secure socket layers (SSL) or the like also ensures that only the source and the destination know the content of the ticket without adding complexity to the authentication protocol.

The session security protocol of this embodiment of the invention applies concepts of public key encryption systems (e.g., a public key infrastructure (PKI) using digital certificates to identify trusted parties) into a shared key environment. In general, public key systems use pair key or dual key encryption in which one key is public and another key is private. For example, the public key encrypts a message and then the private key of the recipient decrypts the message. Data encrypted by the public key can only be decrypted by the private key, and vice versa. In addition, the public and private keys in a given pair have different values such that knowledge of one key does not reveal the other key. Therefore, authentication server 24 can issue the public key to third parties without creating a security risk. PKI is often used in connection with certificates in protocols such as SSL.

Advantageously, fundamental features of a shared symmetric key protocol are maintained, i.e., the ticket content and all of the associated interpretation of the content are not changed. In general, when authentication server 24 is about to encrypt the ticket content, it will generate a random session key (of the same cryptography strength/length as a shared symmetric key). Authentication server 24 uses the random key to encrypt the ticket content using identical encryption algorithms as in a shared symmetric key system. The authentication server 24 then encrypts the random session key with the public key of the destination (i.e., affiliate server 16, 18, or 20).

Further, authentication server 24 uses its private key to create a signature by the following computation: Encrypt (Digest (ticket content)).

Figure 2:
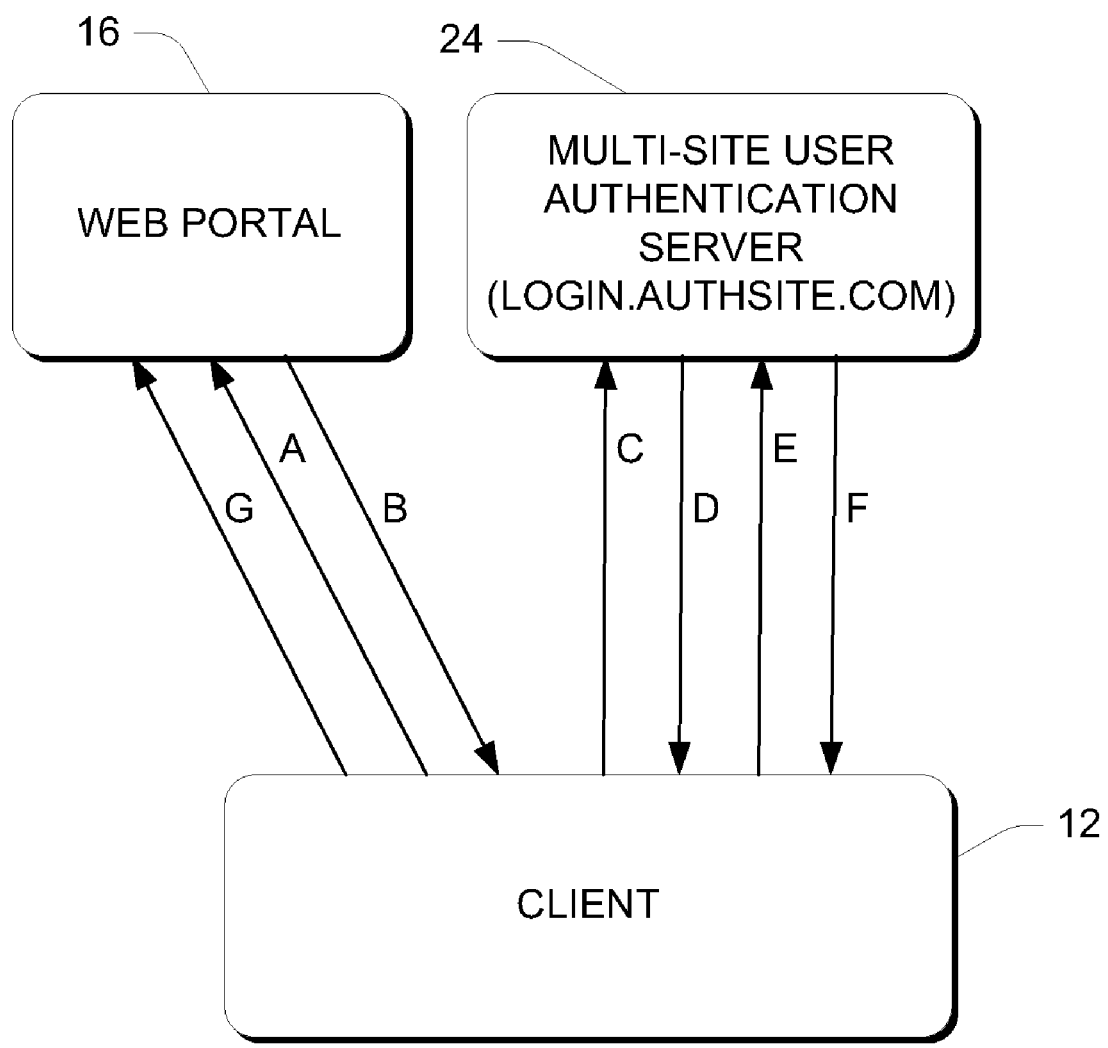
FIGS. 2 and 3 are exemplary flow diagrams illustrating the interaction between a client computer, an affiliate server, and an authentication server of FIG. 1 when a user of the client computer seeks access to the affiliate server.

FIG. 2 is an exemplary flow diagram illustrating an implementation of the present invention and the interaction between client computer system 12, at least one affiliate server 16, and authentication server 24 when a user of the client computer system seeks access to the affiliate server. For simplicity, the following description is directed to affiliate server 16 although the principles apply to affiliate server 18, affiliate server 20, and any other affiliated web service utilizing the multi-site user authentication system.

Figure 3:
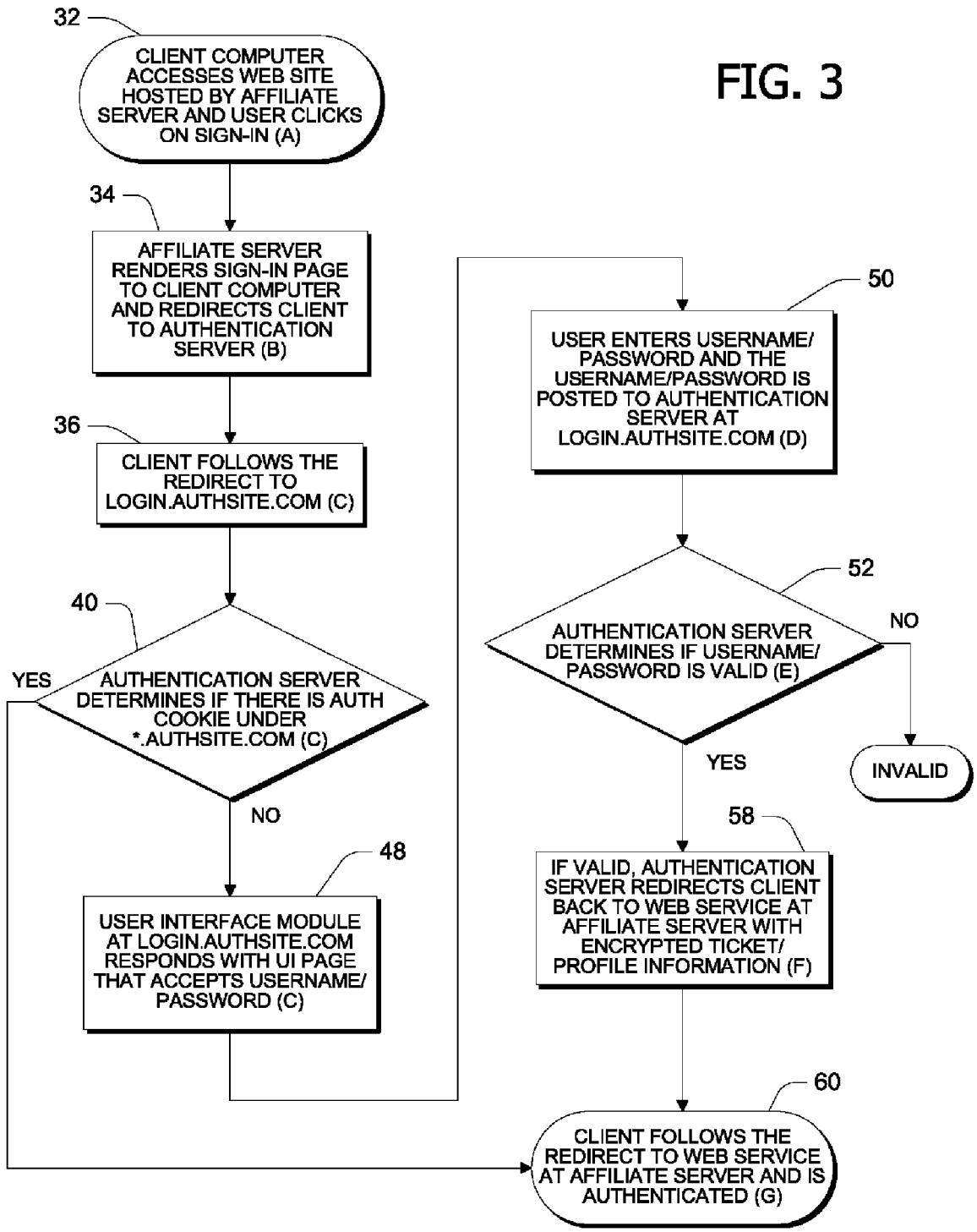

The illustrated example of FIG. 2 describes the situation in which the user of client computer system 12 has not yet logged into affiliate server 16 and has not yet been authenticated by authentication server 24. In one embodiment of the invention, a plurality of authentication servers 24 provides a federated environment. The lines in FIG. 2 labeled "A" through "G" represent the flow of information or activities during the authentication process. The arrows on the lines indicate the direction of the process flow. The label "A" represents the beginning of the processes and the label "G" represents the end of the process. FIG. 3 is an exemplary flow diagram relating to the process of FIG. 2.

In the exemplary process flow of FIGS. 2 and 3, the user of client computer system 12 begins at 32 by accessing a portal service (e.g., MSN® network of Internet services at http://www.msn.com) available via affiliate server 16. At 32, the user selects one of the services available through the portal. For example, the user accesses an online shopping service, or another web service, available through the portal by clicking on a link (e.g., http://eshop.msn.com). (See A).

Proceeding to 34 and 36, the affiliate server 16 first presents the user with a sign-in interface (e.g., "click here to login"). The portal service of affiliate server 16 then redirects client computer system 12 to the multi-site user authentication system provided by authentication server 24 (e.g., Microsoft® Passport sign-in service) when the user clicks on the sign-in interface. (See B). In the example of FIGS. 2 and 3, affiliate server 16 redirects client computer system 12 to login.authsite.com and client computer system 12 follows the redirect command issued by the portal at 36.

At 40, authentication server 24 determines if there is an authentication cookie under the *.authsite.com domain indicating that the user has already been authenticated. If not, a user interface module at login.authsite.com of the authentication server 24 responds at 48 with a user interface page that accepts username/password. (See C). The user enters his or her username/password at 50 and posts the information to authentication server 24 at login.passport.com. (See D). Authentication server 24 then validates the username/password provided by the user at 52. (See E).

If the validation, which occurs at 52, is successful, authentication server 24 looks up the desired web service location and redirects client computer system 12 to the appropriate service (e.g., http://eshop.msn.com/) with encrypted ticket/profile information. (See F). In other words, authentication server 24 retrieves the appropriate location information from authentication database 26 to identify the location of server 16 (or server 18 or 20) providing the selected service. According to one embodiment of the invention, the security protocol employs a general session key to encrypt the message content (e.g., username and password) of the ticket. In turn, authentication server 24 uses the public key of affiliate server 16 to encrypt the session key and then signs the ticket using its own private key.

The client computer 12 then follows the redirect at 60 to the web service at affiliate server 16 (e.g., http://eshop.msn.com) and is authenticated. (See G). In this instance, affiliate server 16 verifies the content of the ticket based on its public key and the signature. Affiliate server 16 then decrypts the session key using its private key and, in turn, decrypts the message content of the authentication ticket using the session key. In the alternative, client computer 12 follows the redirect to https://eshop.msn.com to ensure use of secure socket layers if authentication server 24 does not have the public key of the particular web service.

Returning to 52, if the user-entered information is not correct (i.e., it does not match the information stored in authentication database 26), then authentication server 24 generates and communicates a web page to the user indicating that the login ID and password combination was not valid. In the event of username and/or password failure, security concerns, for example, may limit the number of times the user can attempt to login.

In this embodiment, authentication server 24 adds both the encrypted random key and the signature as a portion of the ticket that is not encrypted by the random key. Authentication server 24 encrypts the session key with a public key of the destination service (i.e., one of the affiliate server 16, 18, 20). Authentication server 24 also uses a private key to sign the content. In this manner, aspects of the invention retain the security properties of a shared symmetric key but not its shortcomings. The session key security protocol assures authentication server 24 that only the particular affiliate server 16 can use the authentication ticket. Likewise, this embodiment assures the destination service (i.e., affiliate server 16) that the ticket came from the correct source (i.e., authentication server 24). This is accomplished by validating the signature with the authentication service's public key. In addition, only the source and destination (i.e., the authentication server and the affiliate server, respectively) know the content of the ticket.

For example, the ticket takes the form of t=$\text{Encrypt}_{sessionkey}$ (username+ . . . ) $\text{PKIEncrypt}_{PP3}$(session key) $\text{PKISignature}_{PVP}$(entire contents) where subscript PP3 denotes a third party public key and subscript PVP denotes a public key of authentication server 24.

Knowledge of the ticket's content need not be limited to the source and the destination if the ticket only contains authentication information and not private user data. In this instance, the content cannot be used at any other location and is of little or no value to a third party attacker. In one embodiment of the session key security protocol, the need for limiting knowledge of the ticket content to authentication server 24 and affiliate server 16 may be relaxed by not requiring the knowledge of the destination's public key. The security ticket simply is not encrypted. To ensure the ticket is not usable by a different destination, the ticket contains destination's address (e.g., domain name) as part of the signature. Thus, the destination service is able to validate the signature with its own domain before using it.

For example, the ticket takes the form of t={PUID+sign in time+ . . . +$\text{siteID}_3$($\text{siteDomain}_3$)} signature where PUID is a unique identification established by authentication server 24 and subscript 3 denotes a third party.

It is to be understood that transporting the non-encrypted authentication ticket over a tamper-resistant, privacy-enhanced protocol such as SSL/TLS also ensures that only the source and the destination know the content of the ticket. This embodiment of the invention further simplifies the key provisioning system because authentication server 24 does not need to know the public key of affiliate server 16.

The flow diagram of FIG. 3 illustrates aspects of a session key security protocol with respect to an authentication service such as Microsoft® Passport sign-in service. It is to be understood that these aspects are also applicable to a Kerberos protocol. Appendix A provides specific examples of the session key security protocol applied to a "passport" protocol utilized by a distributed, multi-site user authentication system (e.g., Microsoft® Passport sign-in service) and applied to a Kerberos protocol.

FIG. 4 shows one example of a general purpose computing device in the form of a computer 70. In one embodiment of the invention, a computer such as the computer 70 is suitable for use in client computer system 12, authentication server 24, user interface server 28, or any of affiliate servers 16, 18, and 20.

In the illustrated embodiment, computer 70 has one or more processors or processing units 72 and a system memory 74. In the illustrated embodiment, a system bus 76 couples various system components including the system memory 74 to the processors 72. The bus 76 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 70 typically has at least some form of computer readable media. Computer readable media, which include both volatile and nonvolatile media, removable and non-removable media, may be any available medium that can be accessed by computer 70. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 70. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 74 includes computer storage media in the form of removable and/or non-removable, volatile and/or nonvolatile memory. In the illustrated embodiment, system memory 74 includes read only memory (ROM) 78 and random access memory (RAM) 80. A basic input/output system 82 (BIOS), containing the basic routines that help to transfer information between elements within computer 70, such as during startup, is typically stored in ROM 78. The RAM 80 typically contains data and/or program modules that are immediately accessible to and/or presently being operated on by processing unit 72. By way of example, and not limitation, FIG. 4 illustrates operating system 84, application programs 86, other program modules 88, and program data 90.

The computer 70 may also include other removable/non-removable, volatile/nonvolatile computer storage media. For example, FIG. 4 illustrates a hard disk drive 94 that reads from or writes to non-removable, nonvolatile magnetic media. FIG. 4 also shows a magnetic disk drive 96 that reads from or writes to a removable, nonvolatile magnetic disk 98, and an optical disk drive 100 that reads from or writes to a removable, nonvolatile optical disk 102 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 94, and magnetic disk drive 96 and optical disk drive 100 are typically connected to the system bus 76 by a non-volatile memory interface, such as interface 106.

The drives or other mass storage devices and their associated computer storage media discussed above and illustrated in FIG. 4, provide storage of computer readable instructions, data structures, program modules and other data for the computer 70. In FIG. 4, for example, hard disk drive 94 is illustrated as storing operating system 110, application programs 112, other program modules 114, and program data 116. Note that these components can either be the same as or different from operating system 84, application programs 86, other program modules 88, and program data 90. Operating system 110, application programs 112, other program modules 114, and program data 116 are given different numbers here to illustrate that, at a minimum, they are different copies.

A user may enter commands and information into computer 70 through input devices such as a keyboard 120 and a pointing device 122 (e.g., a mouse, trackball, pen, or touch pad). Other input devices (not shown) may include a microphone, joystick, game pad, satellite dish, scanner, or the like. These and other input devices are connected to processing unit 72 through a user input interface 124 that is coupled to system bus 76, but may be connected by other interface and bus structures, such as a parallel port, game port, or a universal serial bus (USB). A monitor 128 or other type of display device is also connected to system bus 76 via an interface, such as a video interface 130. In addition to the monitor 128, computers often include other peripheral output devices (not shown) such as a printer and speakers, which may be connected through an output peripheral interface (not shown).

The computer 70 may operate in a networked environment using logical connections to one or more remote computers, such as a remote computer 134. The remote computer 134 may be a personal computer, a server, a router, a network PC, a peer device or other common network node, and typically includes many or all of the elements described above relative to computer 70. The logical connections depicted in FIG. 4 include a local area network (LAN) 136 and a wide area network (WAN) 138, but may also include other networks. Such networking environments are commonplace in offices, enterprise-wide computer networks, intranets, and global computer networks (e.g., the Internet).

When used in a local area networking environment, computer 70 is connected to the LAN 136 through a network interface or adapter 140. When used in a wide area networking environment, computer 70 typically includes a modem 142 or other means for establishing communications over the WAN 138, such as the Internet. The modem 142, which may be internal or external, is connected to system bus 76 via the user input interface 124, or other appropriate mechanism. In a networked environment, program modules depicted relative to computer 70, or portions thereof, may be stored in a remote memory storage device (not shown). By way of example, and not limitation, FIG. 4 illustrates remote application programs 144 as residing on the memory device. It will be appreciated that the network connections shown are exemplary and other means of establishing a communications link between the computers may be used.

Generally, the data processors of computer 70 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The embodiments of the invention described herein include these and other various types of computer-readable storage media when such media contain instructions or programs for implementing the steps described below in conjunction with a microprocessor or other data processor. Embodiments of the invention also include the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 70, aspects of the invention are operational with numerous other general purpose or special purpose computing system environments or configurations. The computing system environment is not intended to suggest any limitation as to the scope of use or functionality. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

The embodiments described herein essentially eliminates the problems inherent in a shared symmetric key protocol with a session key security protocol based on a dual key system. Advantageously, the session key protocol permits economical use with an immense amount of legacy system/software already in place. Also, the protocol utilizes principles that will hasten wide spread adoption by the industry.

Moreover, embodiments of the present invention provide a strong protocol in which the risk of a key being compromised at either end of the protocol is eliminated. For instance, a human break-in at the authentication service can potentially steal all of the keys for every affiliate server. This would essentially shut down the authentication service because of the time needed to revise all of the keys across the entire network of affiliated servers. In contrast, the security protocol described herein permits the authentication service to quickly replace its stolen private key without disrupting the other of trusted parties. Likewise, if the private key at a destination service is stolen, the destination service can independently initiate the process of revising its own private key and public key, rather than waiting for the authentication service to issue a new key. Further, aspects of the present invention permits a destination service to have multiple private/public key pairs (e.g., one per authentication service that it trusts) to isolate security risks.

When introducing elements, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

APPENDIX A

Example 1

Example of session key security protocol applied to a "passport" protocol utilized by a distributed, multi-site user authentication system (e.g., Microsoft® Passport sign-in service).
Structure of Passport Ticket:

```
Ticket = {
    memberidLow integer
    memberidHigh      integer
    lastRefresh       integer
    lastLogin         integer
    currentTime       integer
}
```

All of the content is encrypted up to Passport 2.1 through the shared key.
(1) Without knowledge of a destination's public key, site information and signature can be added as part of the ticket:

```
Ticket = {
    memberidLow integer
    memberidHigh      integer
    lastRefresh       integer
    lastLogin         integer
    currentTime       integer
    siteID            integer
    siteDomain (optional)
    signature
}
```

Signature is Based on Passport's Private Key as:
    Encrypt (Digest (ticket content except signature itself)).
To ensure that the ticket content is not visible by a third party, this ticket content will be only transferred through SSL/TLS network protocol. In the case when an authentication service decides that the memberid is not of critical value to protect, SSL/TLS is not required.

To conform to the latest web standard, Passport's implementation in this embodiment changes the ticket structure into an xml document format.
(2) With knowledge of the destination's public key, the ticket can be encrypted as follows:

```
Ticket = {
    EncryptedContent {
        memberidLow integer
        memberidHigh      integer
        lastRefresh       integer
        lastLogin         integer
        currentTime       integer
    }
    EncryptedSessionKey
    Signature
}
```

EncrytedSessionKey=Encrypt(a random session key) with destination's public key.
    Signature=Encrypt (Digest (ticket except signature)) with Passport's private key.
    EncryptedContent is through the session key.

Example 2

Example of the session key security protocol applied to a Kerberos protocol.
Kerberos Service Ticket Structure:

```
Ticket ::=      [APPLICATION 1] SEQUENCE {
    tkt-vno[0]        INTEGER,
    realm[1]          Realm,
    sname[2]          PrincipalName,
    enc-part[3]       EncryptedData, -- EncTicketPart
    extensions[4]        TicketExtensions OPTIONAL
}
```

Currently, EncryptedData is encrypted using a shared key. In one embodiment, a ticket extension is added to carry a ticketkey, and the ticketkey is used to encrypt EncryptedData. PKI-Ticket-Extension contains the ticketkey encrypted by target (sname)'s public key. In order to prove that the ticket comes from the trusted KDC, PKI-Ticket-Extension also contains a signature of EncryptedData by KDC.

```
PKI-Ticket-Extension: {
    te-type[0]       INTEGER,
    te-TicketKey[1]
    te-Signature[2]
}
``` te-TicketKey=Encrypt (TicketKey) with target's public key.
    te-Signature=Encrypt (Digest (EncryptedData)) with kdc's private key.

What is claimed is:
1. A method for exchanging information in a multi-site authentication system having a first network server and a second network server coupled to a data communication network, said method comprising:
    receiving, from a client computing device via the first network server, a request for a service provided by the second network server;

receiving, from the first network server, an authentication ticket along with the request, said authentication ticket including:
  a session key encrypted by a public key associated with the second network server;
  message content encrypted by the session key; and
  a signature generated by the first network server using a private key associated with the first network server to sign the encrypted session key and the encrypted message content, said signature including address information of the second network server;
decrypting, at the second network server, the signature included in the authentication ticket using a public key associated with the first network server that corresponds to the private key used to generate the signature;
identifying, at the second network server, the address information for the second network server in the verified signature to validate the signature included in the authentication ticket;
verifying, at the second network server, the authentication ticket content based on the validated signature included in the authentication ticket;
decrypting, at the second network server, the encrypted session key included in the authentication ticket via a private key associated with the second network server; and
decrypting, at the second network server, the encrypted message content included in the authentication ticket via the decrypted session key.

2. The method of claim 1 wherein the first network server is an authentication server associated with the multi-site authentication system and wherein the message content includes login information retrieved from a user of the client computing device by said authentication server.

3. The method of claim 2 wherein the login information includes a login ID and a password associated with the login ID.

4. The method of claim 1 wherein the second network server is a portal for providing the client computing device with a gateway to services provided by another network server coupled to the data communication network.

5. The method of claim 1 wherein the first and second network servers are web servers and the data communication network is the Internet.

6. The method of claim 1 wherein the address information of the second network server includes the domain name of the second network server.

7. The method of claim 1 wherein the session key is randomly generated, single-use session key.

8. The method of claim 1 wherein the second network server includes one or more computer-readable storage media having computer-executable instructions executed by said second network server to implement said receiving a request for a service, said receiving an authentication ticket, said identifying, said verifying, said decrypting the encrypted session key, and said decrypting the encrypted message content.

9. A system for exchanging in a multi-site authentication system having an authentication server coupled to a data communication network, said system comprising:
  a network server coupled to the data communication network, wherein said network server includes a processor executing instructions stored on one or more computer-readable storage media to perform the following operations:
    receiving, from a client computing device via the authentication server, a request for a service provided by the network server;
    receiving, from the authentication server, an authentication ticket along with the request, said authentication ticket including a session key encrypted by a public key associated with the network server, message content encrypted by the session key, and a signature generated by the authentication server using a private key associated with the authentication server to sign the encrypted session key and the encrypted message content, said signature including address information of the network server;
    decrypting the signature included in the authentication ticket using a public key associated with the authentication server that corresponds to the private key used to generate the signature;
    identifying the address information of the network server in the signature to validate the signature included in the authentication ticket;
    verifying the authentication ticket content based on the validated signature included in the authentication ticket;
    decrypting the encrypted session key included in the authentication ticket via a private key associated with the network server; and
    decrypting the encrypted message content included in the authentication ticket via the decrypted session key.

10. The system of claim 9 wherein the message content includes login information retrieved from a user of the client computing device by the authentication server.

11. The system of claim 10 wherein the login information includes a login ID and a password associated with the login ID.

12. The system of claim 9 wherein the network server is a portal for providing the client computing device with a gateway to services provided by another network server coupled to the data communication network.

13. The system of claim 9 wherein the address information of the network server includes the domain name of the network server.

14. The system of claim 9 wherein the session key is a randomly generated, single-use session key.

15. A method of exchanging information on a data communication network, said data communication network having at least a client computing device, a network server, and an authentication server coupled thereto, said method comprising:
  receiving, by the network server, a request for a service provided by the network server;
  redirecting, by the network server, the client computing device from the network server to the authentication server, wherein the authentication server receives message content from the client computing device, said message content including authenticating information obtained from a user of the client computing device via a sign-in interface generated in response to the request;
  receiving, from the authentication server, an authentication ticket along with the request, said authentication ticket including:
    a session key encrypted by a public key associated with the network server, wherein the session key is a randomly generated, single-use session key;
    the message content encrypted by the session key; and
    a signature generated by the authentication server using a private key associated with the authentication server to sign the encrypted session key and the encrypted message content, said signature including address information of the network server;

decrypting, by the network server, the signature included in the authentication ticket using a public key associated with the authentication server that corresponds to the private key used to generate the signature;

identifying, by the network server, the address information for the network server in the signature to validate the signature included in the authentication ticket;

verifying, by the network server, the authentication ticket content based on the validated signature included in the authentication ticket;

decrypting, by the network server, the encrypted session key included in the authentication ticket via a private key associated with the network server that corresponds to the public key used to encrypt the session key;

decrypting the encrypted message content included in the authentication ticket via the decrypted session key; and providing the service to the client computing device.

16. The method of claim 15 wherein the network server provides a portal service for providing the client computing device with a gateway to services provided by another network server coupled to the data communication network, and wherein said receiving a request comprises receiving a request for one of said services provided by the another network server.

17. The method of claim 15 wherein the message content includes login information retrieved from a user of the client computing device by the authentication server.

18. The method of claim 17 wherein the wherein the login information includes a login ID and a password associated with the login ID.

19. The method of claim 15 wherein the network server includes one or more computer-readable storage media having computer-executable instructions executed by said network server to implement said receiving a request for a service, said redirecting, said receiving an authentication ticket, said decrypting the generated signature, said identifying, said verifying, said decrypting the encrypted session key, said decrypting the encrypted message content, and said providing.

* * * * *